July 16, 1963  F. G. J. GRISÉ  3,097,441
EARTH MOVER LOAD APPLIED TO FACILITATE GEAR SHIFTING
Filed Dec. 27, 1960
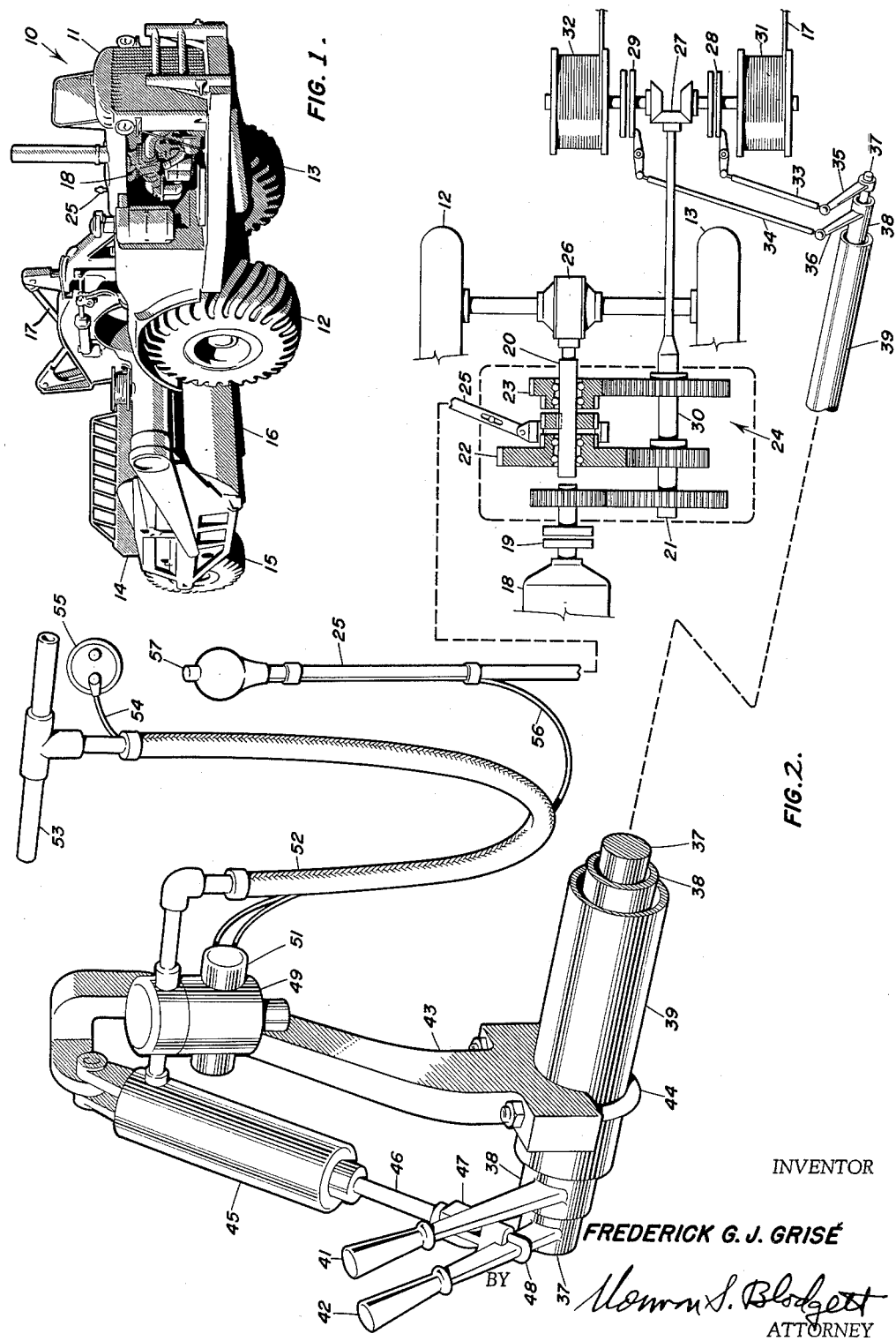
INVENTOR
FREDERICK G. J. GRISÉ
BY Norman S. Blodgett
ATTORNEY United States Patent Office 3,097,441
Patented July 16, 1963

3,097,441
EARTH MOVER LOAD APPLIED TO FACILITATE GEAR SHIFTING
Frederick G. J. Grisé, New Braintree, Mass., assignor, by direct and mesne assignments, of fifty percent to Lionel Grise, Jr., trustee, West Brookfield, Mass., and fifty percent to Norman S. Blodgett, Westboro, Mass.
Filed Dec. 27, 1960, Ser. No. 78,537
4 Claims. (Cl. 37—129)

This invention relates to a vehicle and more particularly to a self-propelled vehicle having an auxiliary load apparatus.

In the operation of heavy duty motor vehicles, one of the most serious problems is that of shifting gears. In shifting from low gear to high gear, at the moment that the clutch is depressed to disconnect the motor from the transmission, the low gear and the motor are in synchronization. The high gear to which the wheels are to be connected is rotating at too great a speed for connection to the wheel shaft, however, and, therefore, cannot be immediately connected to the wheel shaft without disastrous results. The usual practice is to perform an operation called "double clutching," which consists of depressing the clutch to permit shifting of the transmission into neutral. The clutch is then released and the operator takes his foot off the throttle so that the engine slows down and slows down the motor side of the transmission with it. Eventually, the motor and wheel sides of the transmission reach a condition at which they are rotating at a speed that permits them to be connected. It is then safe to again depress the clutch and to shift the transmission into high gear (connect the wheel side of the transmission to the motor side of the transmission). When the clutch is released, the motor is again connected to the wheels to propel the vehicle. If one attempts to use this procedure with a vehicle which is performing heavy work at slow speed, the performance is decidedly unsatisfactory. While the motor is slowing down, the wheel side of the transmission is also slowing down. If the load is very great (as in the case of a tractor with a scraper) and the inertia of the vehicle is low (as it would be at low speed), the vehicle will slow down very quickly and the transmission wheel side speed will slow down so fast that the engine can never match it, despite the fact that it is also slowing down. As a matter of fact, the vehicle speed is often so low that, if the motor is eventually connected to the wheels through the high gear of the transmission, the motor will stall due to inadequate torque transmittal to the wheels to cause forward motion of the vehicle. In any case, it is often impossible to operate the vehicle at higher speeds, since it is impossible to keep the higher vehicle speed necessary to shift into a higher gear. These and other difficulties experienced with the previously-known apparatus have been obviated in a novel manner by the present invention.

It is, therefore, an outstanding object of the invention to provide a vehicle capable of operating at higher gear speeds under heavy load.

Another object of this invention is the provision of control apparatus permitting a vehicle under heavy load to be shifted into a higher gear.

A further object of the present invention is to provide an apparatus for use with a vehicle having an auxiliary, non-propelling load to shift into a higher gear while under a heavy propelling load.

It is another object of the instant invention to provide an attachment for use with a vehicle having an auxiliary, non-propelling load and a heavy propelling load to permit the operator to connect the auxiliary load to the engine side of the transmission before shifting into a higher gear.

It is a further object of the invention to provide an attachment for use with a tractor having an earth-moving blade with a lifting mechanism, the attachment permitting the operator to connect the lifting mechanism load to the engine side of the transmission to slow it down before shifting into a higher gear.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawing in which:

FIG. 1 is a perspective view of a vehicle embodying the principles of the present invention, and FIG. 2 is a somewhat schematic view of the details of the apparatus.

Referring first to FIG. 1, wherein are best shown the general features of the invention, the vehicle, indicated generally by the reference numeral 10, is shown as consisting of a tractor 11 having two propelling wheels 12 and 13 and a trailer 14 having non-driven wheels 15. The trailer is of the type known as a "scraper" and is provided with a blade 16 which is hingedly mounted for vertical movement, such movement taking place by means of a cable 17 within a protecting tube which extends around pulleys suitably placed in the body of the tractor. The tractor 11 is provided with an engine 18 which is connected to the wheels 12 and 13 through the usual clutch, transmission, and differential.

In FIG. 2 it can be seen that the engine 18 is connected through a clutch 19 to the engine side 21 of a transmission 24. The engine side 21 is adapted to mesh with either a low gear 22 or a high gear 23 of a transmission 24. A gear shift lever 25 is located adjacent the operator's seat, as is evident in FIG. 1. The output of the transmission 24 operates by connecting either the low gear 22 or the high gear 23 to a shaft 20 leading to a differential 26 connected to drive the wheels 12 and 13. The engine side 21 has a shaft 30 which is connected through gearing 27 and clutches 28 and 29 to winches 31 and 32, respectively. The winch 31 operates the cable to raise and lower the blade 16, while the winch 32 serves another purpose which is immaterial to the present description. The clutches 28 and 29 are activated by links 33 and 34 which are connected to bell cranks 35 and 36, respectively. The bell crank 35 is fastened to a shaft 37 which lies within a tube 38 to which the bell crank 36 is attached. The tube 38 and the shaft 37 extend forwardly of the tractor through a protective tube 39 and emerge again near the operator's seat. At that position the tube 38 is provided with an actuating handle 41, while the shaft 37 is provided with an actuating handle 42. Mounted on the forward end of the protective tube 39 is a support 43 having a U-clamp 44. Pivotally fastened to the free end of the support 43 is a linear actuator such as a pneumatic cylinder 45 having a piston rod 46 whose outer end is provided with a clevis 47 which is pivotally attached to a U-clamp 48 fastened to the actuating handle 42. Supported by the cylinder 45 is a solenoid-activated valve 49 having a coil 51. One side of the valve is connected pneumatically to the cylinder 45, while the other side is connected through a hose 52 to a source of air under pressure, such as the pipe 53 located forwardly of the firewall of the tractor and supplied with air from a pump, not shown, driven by the engine 18 in a conventional manner. One side of the coil 51 is connected through an insulated wire 54 to the higher voltage side of an electrical source, such as a binding post of the ammeter 55 of the tractor. The other end of the valve-actuating coil 51 is connected through an insulated wire 56 to one side of a pushbutton switch 57 mounted at the top of the gear shift lever 25; the other side of the switch 57 is connected to ground. The wires 54 and 56 are taped to the outer surface of the hose 52.

The operation of the invention will now be readily understood in view of the above description. Assume that the tractor 11 with its trailer 14 is proceeding forwardly in low gear carrying a load of earth with it. In this condition the engine side 21 of the transmission 24 drives the wheels through the low gear 22 and the clutch 19 is in engagement. As the vehicle speed increases under load, it eventually reaches a speed at which it is desirable to shift to a higher gear. The operator then depresses the clutch pedal and opens the clutch 19; he immediately grasps the gear shift lever and shifts the transmission 24 into neutral, i.e., so that neither the low gear 22 nor the high gear 23 drives the wheels. As soon as the transmission 24 is in neutral, the operator presses the switch 57 at the top of the gear shift lever. The closing of the normally-open switch 57 causes electrical current to pass from the binding post of the ammeter 55 through the wire 54, through the coil 51, the wire 56, and the switch 57 to ground. The energization of the coil 51 opens the normally-closed valve 49 and permits pressure air to flow from the pipe 53 through the pipe 52 and the valve 49 to the cylinder 45. The pressure air presses the piston rod 46 outwardly, pressing against the handle 42 and rotating the shaft 37. This rotation operates through the bell crank 35 and the link 33 to close the clutch 28, connecting the engine side 21 of the transmission 24 to the winch 31. Since rotation of the winch would raise the heavy blade 16 (which resists upward movement because of the earth which it is carrying) the winch and blade represent a high inertia load which is suddenly thrown on the engine side of the transmission. The speed of rotation of the engine side of the transmission is suddenly lowered so that the speed of the high gear 23 quickly drops to permit matching with the shaft 20 and it is possible for the operator to shift into high gear. The slowing down of the engine side of the transmission and the shifting from neutral to high gear takes place so rapidly that the vehicle does not have an opportunity to slow down, despite the fact that is is under load in an earth-moving operation or the like. As a practical matter, the operator is able to move the gear shift lever directly from a low gear to neutral and then to a higher gear without pausing, but, of course, depressing the clutch during the movement. It is only necessary that he press the switch 57 as the transmission passes through neutral; this is accomplished without a slowing of the tractor and, of course, without stalling the engine at critical times.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An earth moving machine, comprising an engine, propelling wheels, a transmission having a gear shift lever and including a lower gear and a higher gear adapted to connect the engine to the wheels, a clutch between the transmission and the engine, a scraper-actuating mechanism adapted to be connected to the engine side of the transmission, a clutch for selectively connecting or disconnecting the mechanism and the said engine side of the transmission, a pneumatic linear actuator, an actuator connected to the said clutch for rendering it selectively operative or inoperative to connect the mechanism to the said engine side of the transmission, a source of pressure air connected to the actuator for the energization thereof, a solenoid valve interposed between the said source and the actuator to control the flow of the said air to the actuator, and a switch mounted on the gear shift lever operable selectively by the operator to energize the said valve during shifting of the transmission from neutral after leaving lower gear and before shifting to the higher gear.

2. Control apparatus for an earth moving machine having an engine adapted to be connected through a clutch and a transmission, having a gear shift lever and including a lever gear and a higher gear, to propelling wheels and to a scraper actuating mechanism, the machine having a second clutch for selectively connecting or disconnecting the mechanism to the engine side of the transmission, comprising an actuator connected to the said second clutch for rendering it selectively operative or inoperative to connect the mechanism to the engine side of the transmission, a source of pressure air connected to the actuator for the actuation thereof, a solenoid valve interposed between the source and the actuator, and a switch mountable on the gear shift lever controllable by the operator to control the flow of the said pressure air from the source to the actuator and operable selectively during shifting of the transmission into neutral from the lower gear before shifting to the higher gear.

3. An earth moving machine, comprising an engine, propelling wheels, a transmission having a gear shift lever and including a lower gear and a higher gear adapted to connect the engine to the wheels, a clutch between the transmission and the engine, an earth-handling mechanism adapted to be connected to the engine side of the transmisssion, a clutch for selectively connecting or disconnecting the mechanism and the said engine side of the transmission, a pressure fluid linear actuator, an actuator connected to the said clutch for rendering it selectively operative or inoperative to connect the mechanism to the said engine side of the transmission, a source of pressure fluid connected to the actuator for the energization thereof, a solenoid valve interposed between the said source and the actuator to control the flow of the said fluid to the actuator, and a switch mounted on the gear shift lever operable to energize the said valve during shifting of the transmission from neutral after leaving lower gear and before shifting to the higher gear.

4. Control apparatus for an earth moving machine having an engine adapted to be connected through a clutch and a transmission, having a gear shift lever and including a lower gear and a higher gear, to propelling wheels and to an earth-handling mechanism, the machine having a second clutch for selectively connecting or disconnecting the mechanism to the engine side of the transmission, comprising an actuator adapted to be connected to the said second clutch for rendering it selectively operative or inoperative to connect the mechanism to the engine side of the transmission, a source of pressure fluid connected to the actuator for the actuation thereof, a solenoid valve interposed between the source and the actuator, and a switch mountable on the gear shift lever controllable by the operator to control the flow of the said pressure fluid from the source to the actuator during shifting of the transmission into neutral from the lower gear before shifting to the higher gear.

References Cited in the file of this patent

UNITED STATES PATENTS

| | | |
|---|---|---|
| 1,543,008 | Hanson et al. | June 23, 1925 |
| 2,251,013 | Donley et al. | July 29, 1941 |
| 2,464,039 | Howell | Mar. 8, 1949 |
| 2,727,602 | Saives | Dec. 20, 1955 |
| 2,817,408 | Klemm | Dec. 24, 1957 |
| 2,966,565 | Ryan | Dec. 27, 1960 |